United States Patent

Araki et al.

[11] Patent Number: 5,897,971
[45] Date of Patent: Apr. 27, 1999

[54] EXTRUDABLE LANTHANUM MANGANITE PASTE, EXTRUDED LANTHANUM MANGANITE BODY AND METHOD OF MANUFACTURING POROUS SINTERED LANTHANUM MANGANITE BODY

[75] Inventors: Kiyoshi Araki, Nagoya; Masao Nishioka, Tokoname, both of Japan

[73] Assignee: NGK Insulators, Ltd., Japan

[21] Appl. No.: 08/773,848

[22] Filed: Dec. 27, 1996

[30] Foreign Application Priority Data

Dec. 28, 1995 [EP] European Pat. Off. ............ 95 309 487

[51] Int. Cl.⁶ ...................................................... H01M 4/88
[52] U.S. Cl. ............................ 429/40; 501/152; 264/618; 264/638
[58] Field of Search ............................ 501/152; 264/618, 264/638; 429/40

[56] References Cited

U.S. PATENT DOCUMENTS

| | | | |
|---|---|---|---|
| 4,562,124 | 12/1985 | Ruka | 501/152 X |
| 4,751,152 | 6/1988 | Zymboly | 429/40 X |
| 5,008,092 | 4/1991 | Samdi et al. | 501/152 X |
| 5,108,850 | 4/1992 | Carlson et al. | 429/40 X |
| 5,453,330 | 9/1995 | Kawasaki et al. | 429/40 X |

*Primary Examiner*—Stephen Kalafut
*Attorney, Agent, or Firm*—Parkhurst & Wendel, L.L.P

[57] ABSTRACT

For the production of sintered lanthanum manganite bodies, such as tubes for solid oxide fuel cell air electrodes, there is used extrudable lanthanum manganite paste having a pH of not less than 8, of a dried unfired extruded lanthanum manganite body formed of material having a pH, measured by grinding the material and diluting with water, of at least 7.3. Providing alkalinity in such a paste or body reduces crack formation and increases productivity.

23 Claims, No Drawings

EXTRUDABLE LANTHANUM MANGANITE PASTE, EXTRUDED LANTHANUM MANGANITE BODY AND METHOD OF MANUFACTURING POROUS SINTERED LANTHANUM MANGANITE BODY

BACKGROUND OF THE INVENTION

1. Field of the Invention

The present invention relates to extrudable lanthanum manganite pastes, dried unfired extruded lanthanum manganite bodies, porous lanthanum manganite sintered bodies (e.g. tubes), and methods of manufacturing the same.

2. Description of the Prior Art

Lanthanum mangarite has recently become of increasing interest as a temperature resistant electrically conductive ceramic material. In the art, the term lanthanum manganite includes doped lanthanum mangarites. For this specification and claims we define lanthanum marganite as an oxide of perovskite crystal structure having the formula $$La_{1-x}A_xMn_{1-y}B_yO_3 \pm \delta$$

wherein $0 \leq x \leq 0.75$ $0 \leq y \leq 0.5$ $0 \leq \delta \leq 0.2$ and A is one or more of alkaline earth metals (particularly Ca and Sr), Y and rare earth metals, and B is one or more of Cr, Ni, Co, Al and Zn. A lanthanum manganite sintered body is typically made by mixing starting components e.g. oxides, calcining the mixture to generate the lanthanum mianganite, grinding the calcined product to suitable powder size, shaping the powder and firing.

One use of lanthanum manganite sintered bodies is in solid oxide fuel cells ("SOFs"). SOFCs are promising power generation systems having high efficiency and cleanliness. SOFCs are composed of air electrodes, fuel electrodes, solid electrolytes and interconnectors. For the air electrodes, porous sintered lanthanum manganite having high electroconductivity is used. There are two types of lanthanum manganite air electrodes; one is a thin film electrode on a porous support tube made of, for example, calcia-stabilized zirconia, and the other is a porous lanthanun manganite tube electrode which itself is a support, The latter type is preferable because of simplicity of cell manufacturing process, which leads to low manufacturing cost. This type of air electrode is made by processes such as extrusion, slurry casting, injection molding and so on. Extrusion is especially convenient. After extrusion of a tube, an end closure of the tube may be added, if desired.

However, in a drying process after extrusion, air electrode tubes often microscopically crack and, after sintering, the tubes may be severely cracked reducing production yield. The reason why such cracks occur is not clear as yet.

SUMMARY OF THE INVENTION

The object of the invention is therefore to provide materials and methods which reduce or prevent this occurrence of cracks.

As mentioned the reason why such cracks occur is not clear, but the present inventors have discovered that making pastes and extruded green tubes alkaline is effective to prevent or reduce the cracks, as described below.

According to the present invention in a first aspect there is provided an extrudable lanthanum manganite paste having a pH of not less than 8, preferably in the range 8.5 to 9.5, more preferably 8.7 to 9.3.

According to the invention is a second aspect there is provided a dried unfired extruded lanthanum manganite body, e.g. a tube, formed of material having a pH of at least 7.3, preferably at least 7.5, most preferably in the range 7.5 to 8.5, particularly 7.7 to 7.9.

The pH of the paste referred to herein is defined as the pH of the slurry obtained by diluting the paste four times by weight with water.

The pH of the dried unfired extruded body referred to herein is defined as the pH of the slurry obtained by grinding the body and mixing the powder obtained by grinding with four times its weight of water.

The paste is typically a paste containing water.

To provide the desired pH, the paste or body preferably contains at least one alkaline component in the form of metal salt, metal oxide or metal hydroxide which gives an alkaline solution when dissolved in water. The alkaline component may be a hydroxide, carbonate or other alkaline salt of Li, Na or K. Preferably the paste or body contains at least one of Li, Na or K in an amount (expressed as weight of hydroxide thereof) of at least 200 ppm, more preferably at least 300 ppm.

Alternatively or additionally, the paste or body may contain, as an alkaline component, at least one metal compound which becomes incorporated in the lanthanum manganite crystal structure on firing and which gives an alkaline solution when dissolved in water. This metal compound can suitably be a partially unreacted starting component of a mixture which has been calcined to generate the lanthanum manganite, or may be a component, such as $La_2O_3$ or CaO, added to the lanthanum manganite after the formation thereof. The total amount of such a metal compound or compounds (when present) is preferably in the range 1 to 50%, more preferably 10–40%, by weight of the paste or body.

Particularly when the paste or body according to the invention is used to form an air electrode of a SOFC, the median particle size of the material of the paste or tube is preferably in the range 1 to 22 $\mu$m, more preferably 5 to 15 $\mu$m. When the median particle size is less than 1 $\mu$m, the sintered lanthanum manganite tube becomes low in porosity and sufficient air permeation cannot be obtained. When the median narticle size exceeds 22 $\mu$m, the tube becomes high in porosity and is lower in strength and production yield is not so high.

The paste typically contains conventional additives, particularly binder and pore former.

In yet another aspect, the invention provides a method of making unfired lanthanum manganite body, comprising extruding a paste according to the invention and drying the extruded body. The invention further provides a method of making a porous sintered lanthanum manganite body, e.g. a tube, comprising firing an extruded lanthanum marganite body according to the invention.

Finally, the invention provides a porous sintered lanthanum manganite body made from the paste or the unfired body of the invention.

Although described here in relation to manufacture of tubes, particularly for SOFCs, the invention is generally applicable in the production of extruded, sintered lanthanum manganite bodies.

EXAMPLES

Examples of the invention are given below, as illustration, but the invention is not limited to these

Examples 1

Powders of $La_2O_3$, $CaCO_3$ and $Mn_3O_4$ were mixed in dry condition so that the molar ratio of La;Ca:Mn was equal to 0.8:0.2:1.0, then the mixture was calcined at 1600° C. to form calcia-doped lanthanum manganite, $La_{0.8}Ca_{0.2}MnO_3$. Samples of the calcined $La_{0.8}Ca_{0.2}MnO_3$ powder were ground in a ball mill in a wet condition to a median diameter ranging from 0.5 to 25 μm. The above-described process steps, of calcining and grinding, were repeated three times to ensure homogeneity. To form lanthanum manganite pastes, PVA (polyvinyl-alcohol) as a binder, cellulose as a pore-former, and ammonium or sodium naphthalenesulforate as dispersant (surface active agent) and pH modifier were added to the ground lanthanum manganite powder. 1 normal NaOH solution, potassium carbonate ($K_2CO_3$) or lithium acetate dihydrate ($Li(CH_3COO).2H_2O$) were added to some pastes. Water fraction of all pastes was adjusted to 11.0 wt %. These paste formulations are summarized in Table 1 in which all amounts are in parts by weight.

Samples 6 and 7 are variations of the procedure given above.

In sample 6, the calcia-doped lanthanum manganite (LCM) is a partially reacted material containing residual La, Ca and Mn compounds in an amount of 30% by weight (measured by x-ray diffraction), due to calcination at the lower temperature at 1250° C. These compounds become incorporated in the LCM during the subsequent sintering. The remaining 70% is the calcined LCM.

In sample 7 the LCM contains 30% by weight of a mixture at $La_2O_3$, $CaCO_3$ and $Mn_3O_4$ powders (the molar ratio of La:Ca:Yn in the mixture being 0.8:0.2:1.0 as in the LCM) added after calcination. This mixture becomes incorporated in the LCM in subsequent sintering. The remaining 70% is the calcined LCM.

TABLE 1

Paste formulations

| LCM[*1] | median diameter (μm) | PVA | cellulose | disp. A[*2] | disp. S[*3] | NaOH soln. | Salt K[*6] | salt L[*7] |
|---|---|---|---|---|---|---|---|---|
| Examples | | | | | | | | |
| 1  100 | 10.2 | 3.0 | 3.0 | — | 0.5 | — | — | — |
| 2  100 | 10.2 | 3.0 | 3.0 | 0.5 | — | 2.0 | — | — |
| 3  100 | 10.2 | 3.0 | 3.0 | — | 0.5 | 2.0 | — | — |
| 4  100 | 10.2 | 3.0 | 3.0 | 0.5 | — | — | 1.0 | — |
| 5  100 | 10.2 | 3.0 | 3.0 | 0.5 | — | — | — | 0.5 |
| 6  100[*4] | 9.8 | 3.0 | 3.0 | 0.5 | — | — | — | — |
| 7  100[*5] | 9.9 | 3.0 | 3.0 | 0.5 | — | — | — | — |
| 8  100 | 0.5 | 3.0 | 3.0 | — | 0.5 | — | — | — |
| 9  100 | 1.0 | 3.0 | 3.0 | — | 0.5 | — | — | — |
| 10  100 | 20.3 | 3.0 | 3.0 | — | 0.5 | — | — | — |
| 11  100 | 25.1 | 3.0 | 3.0 | — | 0.5 | — | — | — |
| Comparative Examples | | | | | | | | |
| 1  100 | 10.2 | 3.0 | 3.0 | 0.5 | — | — | — | — |
| 2  100 | 10.2 | 3.0 | 3.0 | 0.5 | 0.5 | — | — | — |

Notes:
*[1]LCM is calcia-doped lanthanum manganite
*[2]disp.A is ammonium naphthalenesulfonate
*[3]disp.S is sodium naphthalenesulfonate
*[4]Modified LCM, described above
*[5]Modified LCM, described above
*[6]salt K is potassium carbonate ($K_2CO_3$)
*[7]salt L is lithium acetate dihydrate ($Li(CH_3COO).2H_2O$)

These pastes were kneaded and extruded into cylindrical tubes of 20 mm outer diameter, 2000 mm in length, 2 mm in wall thickness. 20 tubes of each paste were dried ard fired at 1600° C. for 4 hr. Then, production yield for each example (n=20) was measured, and is given with the pH values of pastes and dried tubes in Table 2. Production yield was assessed by visual inspection for cracks.

TABLE 2 pH values and production yield

| | | paste pH[*1] | dried green tube pH[*1] | production yield (%) |
|---|---|---|---|---|
| Examples | 1 | 8.7 | 7.7 | 85 |
| | 2 | 8.2 | 7.5 | 70 |
| | 3 | 9.3 | 7.9 | 90 |
| | 4 | 8.6 | 7.6 | 85 |
| | 5 | 9.2 | 8.0 | 90 |
| | 6 | 8.8 | 7.7 | 85 |
| | 7 | 9.0 | 7.5 | 80 |
| | 8 | 8.7 | 7.7 | 80 |
| | 9 | 8.7 | 7.7 | 80 |
| | 10 | 8.7 | 7.7 | 75 |
| | 11 | 8.7 | 7.7 | 70 |
| Comparative Examples | 1 | 7.0 | 6.5 | 20 |
| | 2 | 7.4 | 6.6 | 30 |

Note:
*[1]paste and dried tube pH are defined as that of a slurry made up by adding four times by weight of water to the paste or to a powder obtained by grinding the dried tube.

Examples 8 and 11 have median particle size outside the preferred range of 1–22 μm. They are less suitable for self-supporting air electrodes in SOFCs. In Ex.8, porosity is too wow to obtain enough air permeation. Even if porosity is increased by lowering sintering temperature, enough hoop strength (more than 30 MPa) could not be obtained. As for Ex. 11, hoop strength is too low to support a cell. Increasing hoop strength by increasing sintering temperature is not practical because of expensive refractories for higher temperature.

The ammonium naphthalene sulphonate is less effective to raise pH than the sodiun salt, because ammonia is lost during drying. In samples 6 and 7, the free $La_2O_3$ and CaO render the material alkaline when mixed with water.

Example 2

Powders of $La_2O_3$, $Y_2O_3$, $CaCO_3$ and $Mn_3O_4$ were mixed in the dry condition so that molar ratio of La:Y:Ca:Mn was 0.3:0.3:0.4:1.0, then the mixture was calcined at 1600° C. to form the lanthanum-site-substituted lanthanum manganite (LYCM), $La_{0.3}Y_{0.3}Ca_{0.4}MnO_3$. The subsequent processing was as described in Example 1. Paste formulation, pH values and production on yield are summarized in Tables 3 and 4. $Na_2CO_3$ is added to sample no. 12.

Sample 13 is a partially reacted LYCN containing residual compounds of La, Y, Ca and Mn not fully reacted into LYCM during calcination. The weight ratio of LYCN to these residual compounds is 9:1. These compounds become incorporated in the LYCM on sintering.

TABLE 3

Paste formulations in parts by weight

|  | LYCM[*1] | median diameter ($\mu$m) | PVA | cellulose | disp.A | $Na_2CO_3$ |
|---|---|---|---|---|---|---|
| Example 12 | 100 | 12.7 | 2.8 | 3.5 | — | 0.5 |
| Example 13 | 100[*2] | 11.3 | 2.8 | 3.5 | — | — |
| Comparative Example 3 | 100 | 12.7 | 2.8 | 3.5 | 0.5 | — |

Notes:
[*1]LYCM stands for $La_{0.3}Y_{0.3}Ca_{0.4}MnO_3$
[*2]Modified LYCM, described above

TABLE 4 pH values and production yield

|  | paste pH | dried tube pH | production yield (%) |
|---|---|---|---|
| Example 12 | 8.8 | 7.9 | 90 |
| Example 13 | 9.4 | 8.1 | 95 |
| Comparative Example 3 | 7.8 | 6.9 | 40 |

Example 3

Powders of $La_2O_3$, $Nd_2O_3$, $CaCO_3$, $Mn_3O_4$ and NiO were mixed in dry condition so that molar ratio of La:Nd:Ca:Mn:Ni was 0.7:0.1:0.2:0.85:0.15, then the mixture was calcined at 1600° C. to form the lanthanum, manganite, $La_{0.7}Nd_{0.1}Ca_{0.2}Mn_{0.85}Ni_{0.15}O_3$. The subsequent processing was as described in Example 1. Paste formulation, pH values and production yield are summarized in Tables 5 and 6,

TABLE 5

Paste formulation in parts by weight

|  | LM[*1] | median diameter ($\mu$m) | PVA | cellulose | disp.A | disp.S | KOH soln.[*2] |
|---|---|---|---|---|---|---|---|
| Example 14 | 100 | 8.5 | 3.0 | 2.7 | — | 0.5 | — |
| Example 15 | 100 | 8.5 | 3.0 | 2.7 | — | — | 3.0 |
| Comparative Example 4 | 100 | 8.5 | 3.0 | 2.7 | 0.5 | — | — |

[*1]LM stands for $La_{0.7}Nd_{0.1}Ca_{0.2}Mn_{0.85}Ni_{0.15}O_3$
[*2]KOH soln. stands for 1 normal KOH solution

TABLE 6 pH values and production yield

|  | paste pH | dried tube pH | production yield (%) |
|---|---|---|---|
| Example 14 | 8.7 | 7.6 | 75 |
| Example 15 | 8.9 | 7.5 | 80 |
| Comparative Example 4 | 7.1 | 6.7 | 25 |

We claim:

1. An extrudable lanthanum manganite paste having a pH of not less than 8.

2. The paste according to claim 1 wherein the pH is in the range of 8.5 to 9.5.

3. The paste according to claim 1 containing at least one alkaline component which gives an alkaline solution when dissolved in water, said alkaline component is selected from a group consisting of a metal salt, a metal oxide and a metal hydroxide.

4. The paste according to claim 3 wherein said alkaline component is selected from a group consisting of a hydroxide, a carbonate and other alkaline salt of a metal element selected from a group consisting of Li, Na and K.

5. The paste according to claim 4 containing at least one metal element selected from a group consisting of Li, Na and K in an amount (expressed as weigh of hydroxide thereof) of at least 200 ppm.

6. The paste according to claim 3 containing, as said alkaline component, at least one metal compound which becomes incorporated in the lanthanum manganite crystal structure on firing and which gives an alkaline solution when dissolved in water.

7. The paste according to claim 6 wherein said metal compound is a partially unreacted starting component of a calcined mixture used to generate the lanthanum manganite.

8. The paste according to claim 6 wherein the total amount of said metal compound or compounds is in the range of 1 to 50% by the weight of the paste.

9. The paste according to claim 1 comprising a maternal having a median particle size in the range of 1 to 22 $\mu$m.

10. A method of making an unfired lanthanum manganite body, comprising the steps of extruding the paste according to claim 1 to form an extruded body and drying the extruded body.

11. A method of making a porous sintered lanthanum manganite body, comprising the steps of extruding the paste according to claim 1 to form an extruded body, drying the extruded body to provide an unfired lanthanum manganite body and firing the unfired lanthanum manganite body.

12. A dried and unfired extruded lanthanum manganite body formed of a material having a pH of at least 7.3.

13. The body according to claim 12 which is in the shape of a tube.

14. The body according to claim 12 wherein the pH is at least 7.5.

15. The body according to claim 14 wherein the pH is in the range of 7.5 to 8.5.

16. The body according to claim 12 containing at least one alkaline component which gives an alkaline solution when dissolved in water, said alkaline component is selected from a group consisting of a metal salt, a metal oxide and a metal hydroxide.

17. The body according to claim 16 wherein said alkaline component is selected from a group consisting of a hydroxide, a carbonate and other alkaline salt of a metal element selected from a group consisting of Li, Na and K.

18. The body according to claim 17 containing at least one metal element selected from a group consisting of Li, Na and K in an amount (expressed as weight of hydroxide thereof) of at least 200 ppm.

19. The body according to claim 16 containing, as said aikaline component, at least one metal compound which becomes incorporated in the lanthanum manganite crystal structure on firing and which gives an alkaline solution when dissolved in water.

20. The body according to claim 19 wherein said metal compound is a partially unreacted starting component of a calcined mixture used to generate the lanthanum manganite.

21. The body according to claim 19 wherein the total amount of said metal compound or compounds is in the range of 1 to 50% by the weight of the body.

22. The body according to claim 12 wherein the material has a median particle size in the range of 1 to 22 µm.

23. A method of making a porous sintered lanthanum manganite body, comprising firing the extruded lanthanum manganite body according to claim 12.

* * * * *